No. 801,546. PATENTED OCT. 10, 1905.
S. A. PHENIS.
HARROW.
APPLICATION FILED MAY 16, 1905.
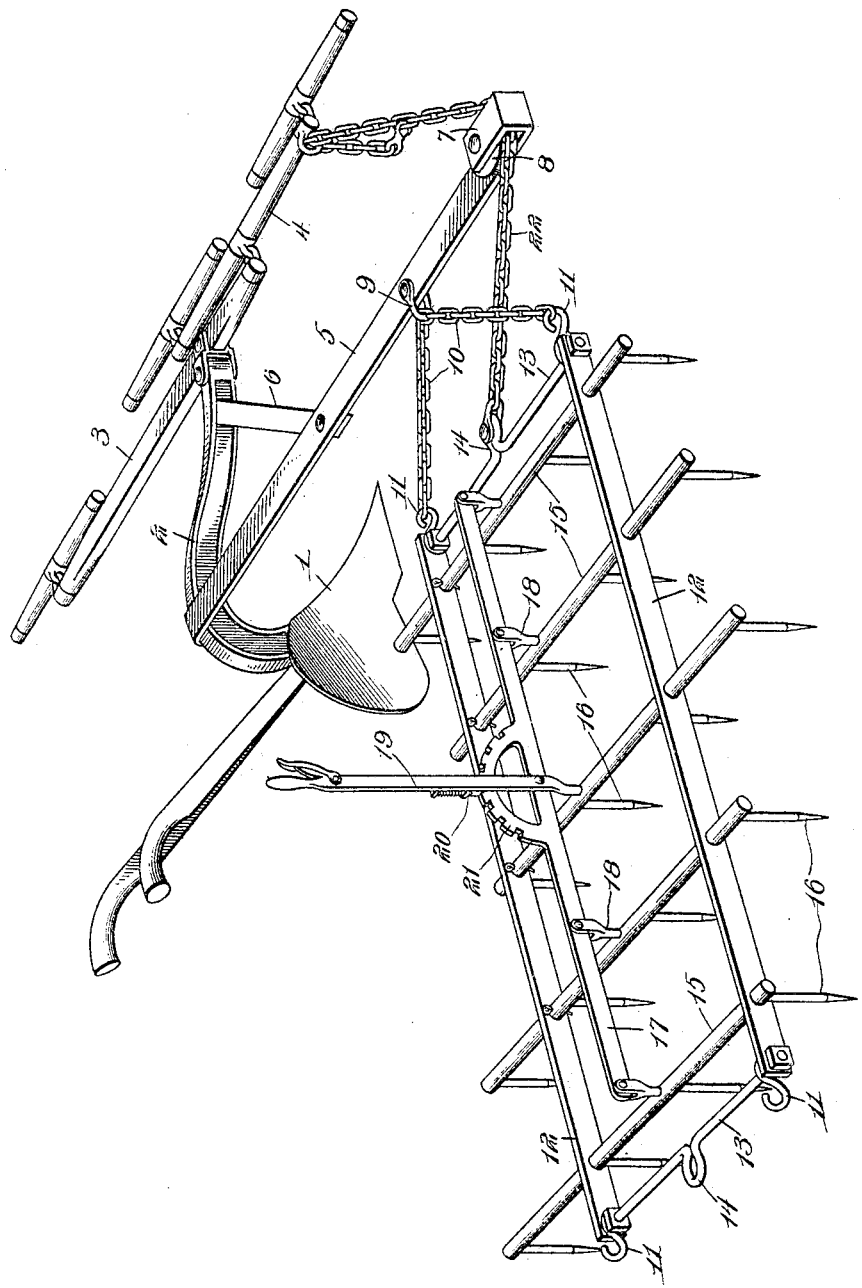
Witnesses
Louis D. Heinrichs
Hubert D. Lawson
Inventor
S. A. Phenis
By W. T. FitzGerald & Co.,
Attorneys

UNITED STATES PATENT OFFICE.

SOLOMON A. PHENIS, OF PERRY, OKLAHOMA TERRITORY.

HARROW.

No. 801,546.　　　Specification of Letters Patent.　　　Patented Oct. 10, 1905.

Application filed May 16, 1905. Serial No. 260,689.

*To all whom it may concern:*

Be it known that I, SOLOMON A. PHENIS, a citizen of the United States, residing at Perry, in the county of Noble and Territory of Oklahoma, have invented certain new and useful Improvements in Harrows; and I do hereby declare the following to be a full, clear, and exact description of the invention, such as will enable others skilled in the art to which it appertains to make and use the same.

My invention relates to agricultural machines, and it is more particularly a combined plow and harrow.

The object of the invention is to so arrange the harrow in connection with a plow that the earth will be promptly pulverized as soon as overturned by the plow and while it is still in a moist condition.

Another object is to provide means operated by the whiffletree of the machine for moving the harrow away from the plow when the machine is turned; and still another object is to provide a reversible harrow having adjustable teeth which can be located at any desired angle to the frame of the harrow.

With the above objects in view the invention consists of a plow having a laterally-extending arm secured to its stock, and a harrow-frame is connected to this arm by a chain or other flexible device. A second chain or like device is connected to the center of one end of the harrow and passes around a pulley mounted at the free end of the arm of the stock, and this last-mentioned chain is connected to the whiffletree of the stock in such a manner that when the plow is turned in one direction by the draft-animals the harrow is moved laterally away from the plow.

The invention also consists of certain other novel features of construction and arrangement of parts, which will be hereinafter more fully described, and pointed out in the claims.

In the accompanying drawing, which is a perspective view, I have shown the preferred form of my invention.

Referring to the drawing by numerals of reference, 1 is a plow of ordinary construction, having a beam 2, to which is connected a doubletree 3, having a doubletree 4 connected to one end thereof. An arm 5 is secured to beam 2 and extends laterally therefrom. This arm is braced by the strip 6 and has an inwardly-bent extension 7 at its free end, and a pulley 8 is mounted between the arm and its extension.

Extending from arm 5 at a point between its ends is a loop 9, which engages a chain 10 at a point midway its ends. The ends of this chain are detachably connected, by means of hooks 11, to opposite sides of one end of the frame of the harrow. This frame consists of side bars 12, connected at their ends by crossrods 13, provided with centrally-located loops 14. Bars 15 extend transversely of the frame and are rotatably mounted in the side bars 12. Each bar 15 has harrow-teeth 16 extending from it, and all of the bars are adapted to be moved in unison by an operating-strip 17, which is pivoted to arms 18, extending upward from all but one of the bars 15. This one bar 15 has a lever 19 extending upward from it and provided with a spring-pressed dog 20 for engaging a segment formed upon or secured to the strip 17. Lever 19 is pivoted to strip 17, and the segment is concentric with said pivot. A chain 22 is adapted to be connected to the loop 14 at the front end of the harrow, and this chain extends around pulley 8 and is adjustably connected to one end of the doubletree 4.

By referring to the drawing it will be seen that the plow 1 is in advance of the harrow, and therefore when the soil is overturned thereby it will fall into the path of the harrow and be pulverized thereby while in a moist condition. When the machine is drawn to the right, the harrow will naturally move from the plow; but under ordinary conditions when the machine is turned to the left the harrow would swing back and interfere with the manipulation of the plow. To avoid this objectionable result, I have provided a connection between one end of the harrow and the doubletree. It will therefore be seen that when the device is turned the chain 22 will be pulled upon in such a manner as to draw the harrow away from the plow, and thereby prevent it from interfering with the operator.

By releasing the dog 20 from segment 21 lever 19 can be swung so as to cause the simultaneous rotation of all of the bars 15, and the teeth of said bars can therefore be adjusted to any desired inclination. Should the teeth become worn on one side from constant use, the harrow can be reversed and its other end connected to the chains 10 and 22.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I therefore claim as new, and desire to secure by Letters Patent, is—

1. The combination with a plow having a doubletree connected thereto and an arm extending laterally from the plow; of a harrow connected to the arm and means connected to the harrow and doubletree for moving the harrow from the plow when turned in one direction.

2. The combination with a plow and draft devices connected to the plow; of a harrow connected to the plow and means operated by the draft devices for drawing the harrow away from the plow when turned in one direction.

3. The combination with a plow having draft devices connected thereto, and an arm extending laterally from the plow; of a harrow, a flexible connection between the harrow and arm, and means operated by the draft devices for moving the harrow laterally from the plow while turning in one direction.

4. The combination with a plow and draft devices connected thereto; of a laterally-extending arm rigidly connected to the plow, a flexible connection between the harrow and arm and a flexible connection between the harrow and the draft devices, said last-mentioned connection movably engaging the arm and adapted to be operated by the draft devices for actuating the harrow.

5. In a device of a character described the combination with a plow having a laterally-extending arm and draft devices; of a harrow, a flexible connection between the harrow and arm, a flexible connection between the harrow and the draft devices and adapted to be operated by the draft devices for actuating the harrow and a pulley upon the arm constituting a bearing for the last-mentioned connection.

6. The combination with a plow; of a harrow flexibly connected thereto and arranged in rear and at one side thereof, draft devices connected to the plow, and means actuated by said devices for positively moving the harrow away from the plow when turned in one direction.

In testimony whereof I have signed my name to this specification in the presence of two subscribing witnesses.

SOLOMON A. PHENIS.

Witnesses:
BERTHA HOWARD,
J. RAY ABRAHAM.